Oct. 18, 1932.                    M. W. McCONKEY                    1,882,852
                         MANUAL ELECTRIC BRAKING SYSTEM
                    Filed June 29, 1928           2 Sheets-Sheet 1
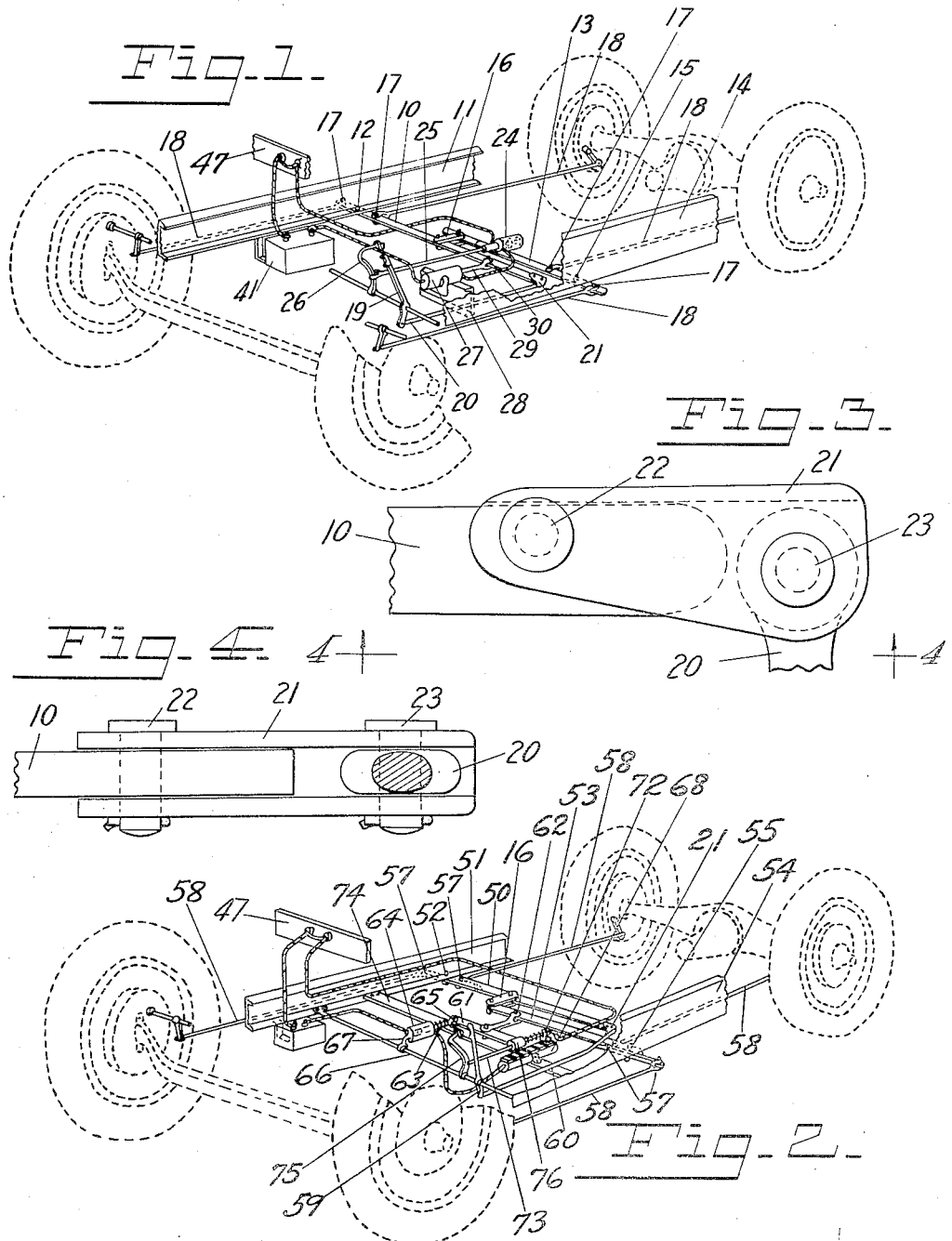

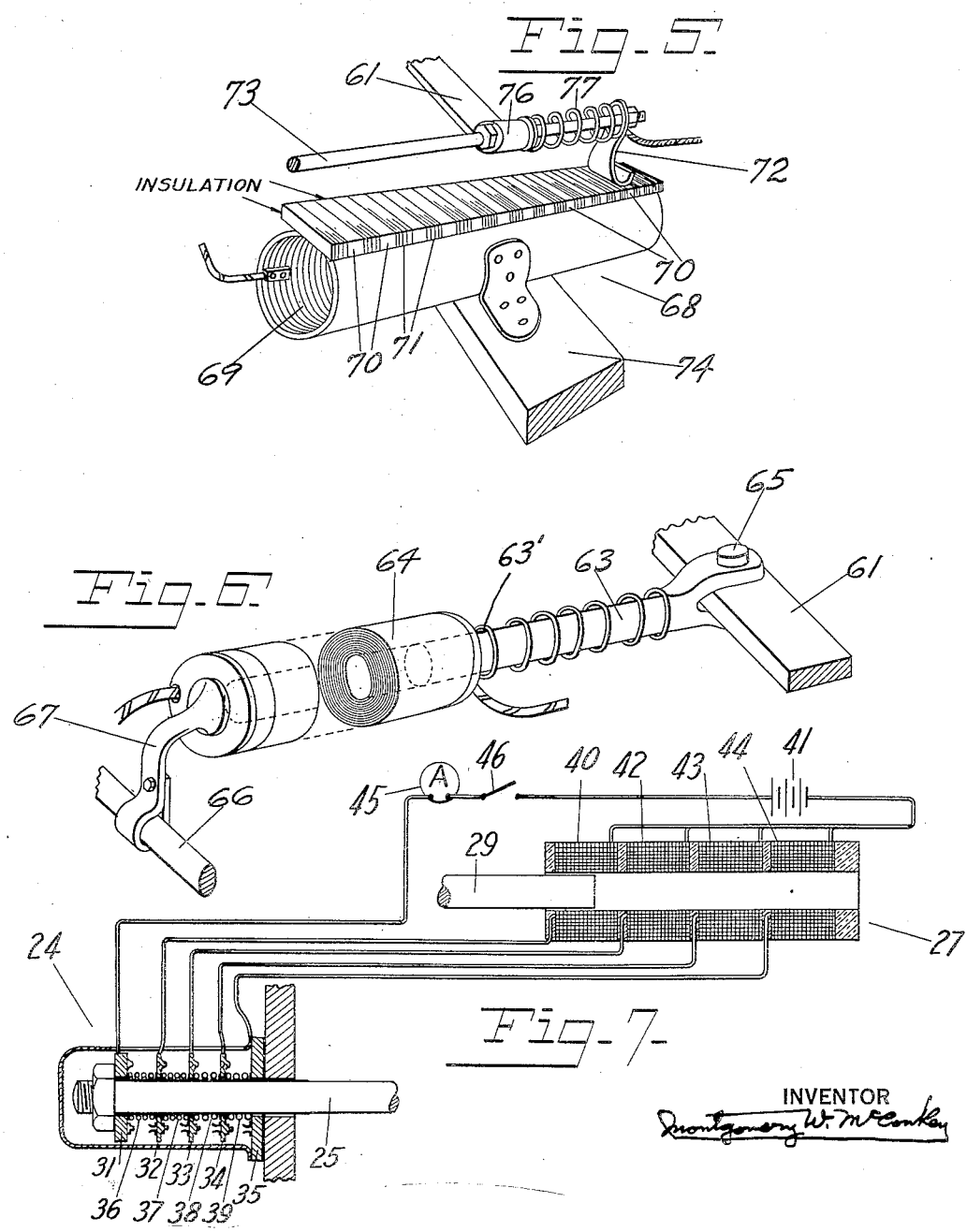

Patented Oct. 18, 1932

1,882,852

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

MANUAL ELECTRIC BRAKING SYSTEM

Application filed June 29, 1928. Serial No. 289,120.

My invention relates to the class of braking systems known as servo or booster brakes wherein the manual effort ordinarily employed to operate the brakes is constantly and proportionately augmented by power means.

An object of my invention is to so connect an electro-magnetic power device and a suitable controller therefor in the brake operating linkage as to maintain a substantially constant relation between the magnetic and the manual effort being at any time exerted to apply the brakes.

Another object is to operate the controller for the electromagnetic device by the manual brake applying means with certain yielding means suitably placed in the linkage to permit further controller movement and consequently additional electrical effort to be added to the manual effort whether the combined effort creates movement in the linkage beyond the yielding means or not.

Still another object is to place a suitable instrument in the electric circuit within view of the operator to record the value of the current being at any time employed, thus to indicate the braking effort being exerted, to the end that the operator by observation of the instrument may apply his brakes to better effect.

I attain these and other objects by mechanism constructed and arranged as shown in the following drawings in which—

Fig. 1 is a perspective view of an automobile chassis in which mechanism embodying my invention is assembled.

Fig. 2 shows the invention in a modified form.

Fig. 3 is a top plan view of the overrunning link usually employed to permit the emergency lever to remain stationary when the foot pedal is operated, the link being modified to adapt it to the linkage system herein employed.

Fig. 4 is a view of Fig. 3 taken in the direction of arrows 4—4.

Fig. 5 is a perspective view of the controller which is shown to a smaller scale in the assembly Fig. 2.

Fig. 6 is a perspective view of the solenoid which is employed in the assembly Fig. 2.

Fig. 7 is a cross section showing, more or less schematically, the solenoid and the controller used in the assembly Fig. 1, and the manner in which they are electrically connected.

Similar numerals refer to similar parts thruout the several views.

In Fig. 1 a lever 10 is pivoted on the frame side member 11 at 12. A similar lever 13 is pivoted on side member 14 at 15. The long arms of levers 10 and 13 are connected by link 16.

Equidistant from pivots 12 and 15 pins 17 join brake rods 18 to the levers. Brake rods 18 extend forward and rearward to operate the brake cams.

The emergency brake lever 19 is connected to the end of lever 10 by rod 20. An overrunning link 21 (see also Figs. 3 and 4) is pivoted at 22 and 23 to permit movement of lever 10 when required without moving rod 20.

An electric-current controller 24 is secured to lever 13, and the controller operating rod 25 is joined to foot pedal 26. The stationary portion of the solenoid 27 which is governed by controller 24 is mounted on cross member 28 while the movable core 29 is pivoted at 30 to lever 10.

Fig. 7 shows controller 24 and solenoid 27 somewhat schematically and to a larger scale for clearness. The controller comprises a series of metal washers 31, 32, 33, 34 and 35, spaced apart by springs 36, 37, 38, and 39, the series of springs increasing in strength from left to right in the drawings, so that when controller operating rod 25 is drawn forward by pedal 26, the weaker spring 36 is first depressed, permitting contact of washers 31 and 32 whereby the first division 40 of solenoid 27 is energized by battery 41. Further foot-pedal effort on rod 25 successively depresses springs 37, 38 and 39 and thereby successively adds the energy of divisions 42, 43 and 44 of the solenoid winding to draw core 29 into the coils. The washers 31 to 35 inclusive are, of course, electrically insulated from all other parts and from each other.

An ammeter 45 and a switch 46 are placed in the circuit and mounted on the face of the instrument board 47 (see Fig. 2). By the switch the operator may eliminate the electrically operated braking means from the system when he desires to brake by manual means alone, and by reading the ammeter he may govern his braking effort to better advantage. The ammeter is preferably graduated to indicate the pounds of braking effort being applied instead of the amperes flowing.

In operation pedal 26 is depressed drawing rod 25 forward. Now, since controller 24 is mounted on lever 13 the brakes will be applied by manual effort alone unless springs 36, 37, etc. yield. But these springs are so proportioned that as soon as a limited amount of manual braking effort has been applied, spring 36 is overcome, and a portion of the available electrical effort is added to the manual effort. As greater manual effort is applied and the stronger springs are overcome, more electrical effort will be added.

Attempts heretofore made to combine manual brake applying means and electromagnets controlled by manually operable rheostats do not show that consideration was given to the fact that where considerable movement is required between steps of the rheostat a yielding means must be associated therewith, otherwise as soon as the brake shoes are against the brake drum and all the back lash is taken up in the linkage, no further pedal movement is possible, and while further manual effort may be applied to increase the braking effect, if no perceptible pedal movement occurs therefrom the next step of the rheostat will not be reached to get further assistance from the magnetic means.

Fig. 2 shows a modification of my invention but embodying the same principle illustrated in and described relative to Fig. 1 and differs therefrom principally in the control means, in that the embodiment shown in Fig. 1 controls by combining several solenoid coils to increase the magnetic strength, while in Fig. 2 resistance turns of the controller, normally in the circuit, are eliminated to increase the current passing thru the effective turns of the solenoid.

In Fig. 2 a lever 50 is pivoted on frame side-member 51 at 52. A similar lever 53 is pivoted on side member 54 at 55. The long arms of levers 50 and 53 are connected by a link 16.

Equidistant from point 52 and equidistant from point 55, pins 57 join brake rods 58 to the levers. Brake rods 58 extend forward and rearward to operate the brake cams.

The emergency brake lever 59 is connected to the end of lever 50 by rod 60. The overrunning link 21 (see also Figs. 3 and 4) is employed in the same manner as in Fig. 1.

An equalizing bar 61 is joined at its middle to lever 53 by link 62. Core 63 of solenoid 64 is hinged to one end of bar 61 at 65. Solenoid 64 is supported on cross rod 66 by arm 67. The solenoid and its core and connections are shown to an enlarged scale in Fig. 6. A coil spring 63' encircles core 63, the extremities thereof abutting the casing of solenoid 64 at one end and the bifurcated end of core 63 at its other end, thus yieldably urging the core to release position.

The controller 68, shown to an enlarged scale in Fig. 5, comprises a plurality of turns of resistance wire 69 connected at intervals to contact bars 70 which are separated by bars of insulation 71. A sliding contact member 72 is adapted to be drawn forward by rod 73 to decrease the number of resistance turns in the circuit.

Controller 68 is mounted on cross member 74, and the rod 73 which carries contact member 72 at one end is hinged at its other end to pedal 75. This rod passes slidably thru the enlarged end 76 of bar 61, the spring 77 being interposed between member 72 and end 76 (see Fig. 5).

In operation pedal 75 is depressed drawing rod 73 forward until contact member 72 reaches the first contact bar 70 which completes a circuit thru the winding of solenoid 64 and all of the resistance wire 69. Slight magnetization results and core 63 moves slightly forward. Further movement of rod 73 cuts more resistance wire 69 from the circuit and further strengthens the magnetic pull which draws core 63 further forward. It will be seen that the manual and magnetic means operate together thru bar 61 on link 62 to apply the brakes.

When the brake shoes make contact with the brake drums and the slack in the linkage is all taken up, the pedal 75 may be further depressed by compressing spring 77 whereby advanced contact bars are reached and the magnetic effort increased whether perceptible movement occurs in bar 61, link 62 or any other part of the linkage.

While in the foregoing description and drawings I have illustrated and described several embodiments of my invention, it will be readily seen that many changes in the linkage, and in the magnetic means and their controls may be made without departing from the spirit of the invention. With a view of embracing permissible embodiments not shown, I claim:—

1. A manual electric braking system comprising, brakes, manual means to apply said brakes, magnetic means to operate in conjunction with said manual means, and yieldable means coupling said manual applying means with the brakes including a member associated with the magnetic means whereby the magnetic strength is increased by certain successive steps after the manual braking effort reaches a certain value determined by the strength of the yieldable means.

2. A manual-electric braking system comprising, brakes, brake applying linkage, electro-magnetic means connected to said linkage to apply said brakes, controlling means to vary the strength of the electro-magnetic means, manual means so connected to the brake applying linkage as to operate both the controlling means and the brakes, and a yielding means to permit the controlling means to be further operated after the brakes are fully applied.

3. A manual-electric braking system comprising, brakes, brake applying linkage, electro-magnetic means connected to said linkage to apply said brakes, a controller to vary the strength of the electro-magnetic means, and manual means affixed to an operative member of said controller, and joined to the brake applying linkage thru yielding means, said yielding means being adapted to permit considerable movement of said controller operative member with no perceptible movement of said brake applying linkage.

4. A manual-electric braking system comprising, brakes, electro-magnetic means to apply said brakes, controlling means to vary the strength of the electro-magnetic means, manual means to operate said controlling means, and yielding means between said controlling means and the brake operating linkage thru which the manual effort exerted to operate the controller is transmitted to said brake operating linkage.

5. Braking mechanism comprising, brakes, an electro-magnet to apply said brakes, a controller to vary the strength of the electro-magnet by movement of one of its elements said movement being resisted by yieldable means, and means to move said element by manual pressure applied thereto, the same said pressure being at all times transmitted thru the said element to manually apply the brakes.

6. A manual-electric braking system comprising, brakes, brake operating linkage, an electro-magnetic device having its movable element connected to said linkage, a variable controller for said device, a manually operable rod connected to the operable element of said controller, and a yielding means between said operable element and said linkage, whereby said linkage is yieldingly operated.

7. An automotive braking system comprising, brakes, brake operating linkage, a solenoid having its coil affixed to the chassis and its core connected to said linkage, a controller for said solenoid to vary the strength thereof, a pedal, a rod, connecting said pedal and the operable element of said controller, and a spring interposed between said operable element and said linkage whereby said linkage may be operated by said pedal.

8. The combination in an automotive braking system of brakes, electro-magnetic means to apply said brakes, and an ammeter in the electric circuit graduated in pounds of braking effort to indicate the degree of braking effort being applied.

9. A manual electric braking system comprising brakes, manual means to apply said brakes, magnetic means to operate in conjunction with said manual means and yieldable means coupling the brakes with the manual applying mechanism associated with said magnetic applying means whereby the magnetic strength is increased after the manual braking effect reaches a value determined by the strength of the yieldable means.

10. The combination in an automotive braking system of brakes, electric means to apply said brakes, and an ammeter in the electric circuit graduated in pounds of braking effort to indicate the degree of power to the degree of braking effort being applied.

11. In combination with automotive vehicle brake linkage, manual and magnetic power means coupled with said linkage, said magnetic means being controlled by said manual means, and yieldable means constituting a portion of the manual coupling whereby said manual means may be further operated to increase the magnetic power after the braking torque equals the manual power available.

12. In combination with brakes and manual means, including a yieldable connection, for applying said brakes, electric means for applying said brakes, and means for controlling the power effort of said electric means, said control means including a part of said yieldable connection.

13. Brake mechanism comprising, in combination, brakes, manual means to apply the brakes including as a mechanical tension transmitting part thereof a variable electric controller, an electric power device to apply the brakes, said controller being coupled with the power device to vary the brake applying force thereof in direct proportion to the manual brake applying power mechanically transmitted by the controller.

14. Brake mechanism comprising, brakes, a brake operating member, tension connections leading therefrom to the brakes, a power device to assist said brake operating member, and a variable controller for said power device forming part of said connections and adapted to increase the force exerted by said power device in proportion as the tension upon the connections is increased.

15. Brake mechanism comprising, in combination, brakes, manual means to apply the brakes including as a mechanical tension transmitting part thereof a variable power control device, power means to apply the brakes, said power control device adapted to vary the brake applying effort of the power means in proportion to the manual brake applying effort mechanically transmitted by it.

16. Brake mechanism comprising, in combination, brakes, power means to apply the brakes, and manual means to apply the brakes including as a mechanical tension transmitting part thereof a yielding variable power control device adapted to vary the brake applying effort of the power means as it yields in response to the manual brake applying effort exerted thereupon.

17. Brake mechanism comprising, in combination, brakes, power means to apply the brakes, and manual means to apply the brakes including as a mechanical tension transmitting part thereof a variable power control device adapted to increase the brake applying effort of the applying means by successive increments as the control device yields successive increments in response to the brake applying effort exerted thereupon.

In testimony whereof I hereunto set my hand.

MONTGOMERY W. McCONKEY.